United States Patent [19]

Houser et al.

[11] Patent Number: 4,930,093

[45] Date of Patent: May 29, 1990

[54] METHOD OF MEASURING MESSAGE RESPONSE TIME PERFORMANCE OF A DATA PROCESSING SYSTEM INCLUDING DATA TERMINALS

[75] Inventors: James S. Houser, Cambridge; Don C. Finfrock, both of Cambridge, Ohio

[73] Assignee: NCR Corporation, Dayton, Ohio

[21] Appl. No.: 226,923

[22] Filed: Aug. 1, 1988

[51] Int. Cl.[5] ........................ G04F 10/00; G05B 23/00

[52] U.S. Cl. ................................ 364/551.01; 364/569; 364/900; 340/825.08

[58] Field of Search .................... 364/551.01, 569, 550, 364/405, 552, 200, 900; 371/22; 340/825.07, 825.08, 825.16; 379/92, 107; 235/438; 358/84

[56] References Cited

U.S. PATENT DOCUMENTS

| | | | |
|---|---|---|---|
| 3,701,864 | 10/1972 | Marotte | 371/22 |
| 3,771,144 | 11/1973 | Belady et al. | 364/200 |
| 4,245,311 | 1/1981 | Nakamura | 364/405 |
| 4,271,513 | 6/1981 | Maejima et al. | 371/22 |
| 4,369,493 | 1/1983 | Kronenberg | 364/200 |
| 4,410,984 | 10/1983 | Negi et al. | 371/22 X |
| 4,425,619 | 1/1984 | Matsuda et al. | 364/405 |
| 4,459,656 | 7/1984 | Wilder, Jr. | 364/200 |
| 4,484,277 | 11/1984 | Uesugi | 364/405 |
| 4,564,904 | 1/1986 | Kumagai | 364/405 |
| 4,583,089 | 4/1986 | Cope | 340/825.05 |
| 4,750,175 | 6/1988 | Brenneman et al. | 371/22 |
| 4,823,347 | 4/1989 | Chin et al. | 371/22 X |
| 4,841,437 | 6/1989 | Lubarsky et al. | 371/22 X |

FOREIGN PATENT DOCUMENTS 1458200 12/1976 United Kingdom .

OTHER PUBLICATIONS

"Printing Response Time Monitor", Model PRTM-a Four Page Flyer describing a Device of Questronics, Inc., 1978.

"Response Time Monitor",-Model 300-A Two Page Flyer Describing a Device of Questronics, Inc., 1978.

"Response Time Monitor"-Model TRTM-a two page flyer by Questronics, Inc., 1978, Salt Lake City, Utah.

*Primary Examiner*—Parshotam S. Lall

*Assistant Examiner*—Joseph L. Dixon

*Attorney, Agent, or Firm*—Wilbert Hawk, Jr.; Albert L. Sessler, Jr.

[57] ABSTRACT

A method of measuring message response time performance of a data processing system includes the generation of timing messages when a data or status message is sent from a data terminal, such as a point of sale terminal in the system to a central processing unit, and when a data message is received at the terminal from the central processing unit. The timing messages include identification of type of message, time data taken from a timer in the terminal, and a sequence number which permits related messages to be paired so that the time values in each can be compared to determine a response time for the total period required for transmission of messages from the terminal to the central processing unit, any necessary data processing at the central processing unit and transmission of a message from the central processing unit back to the terminal.

12 Claims, 5 Drawing Sheets

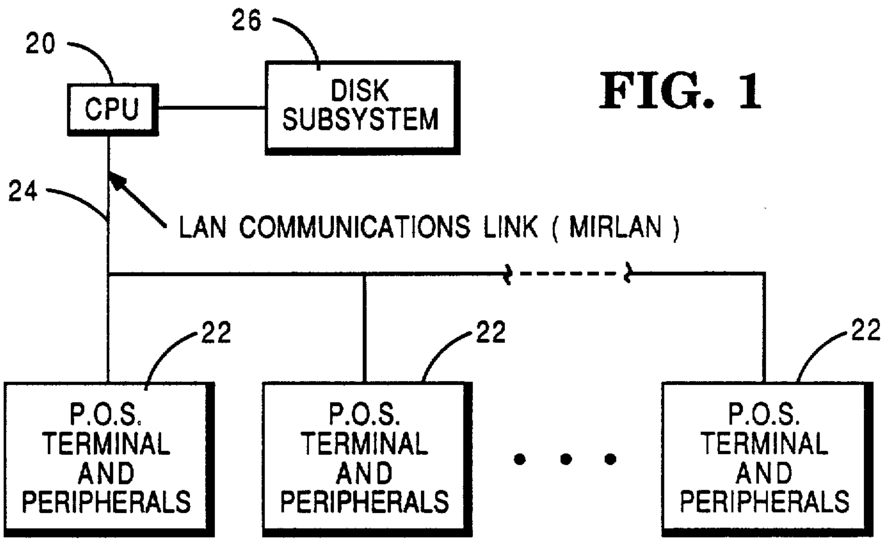
FIG. 1
FIG. 2
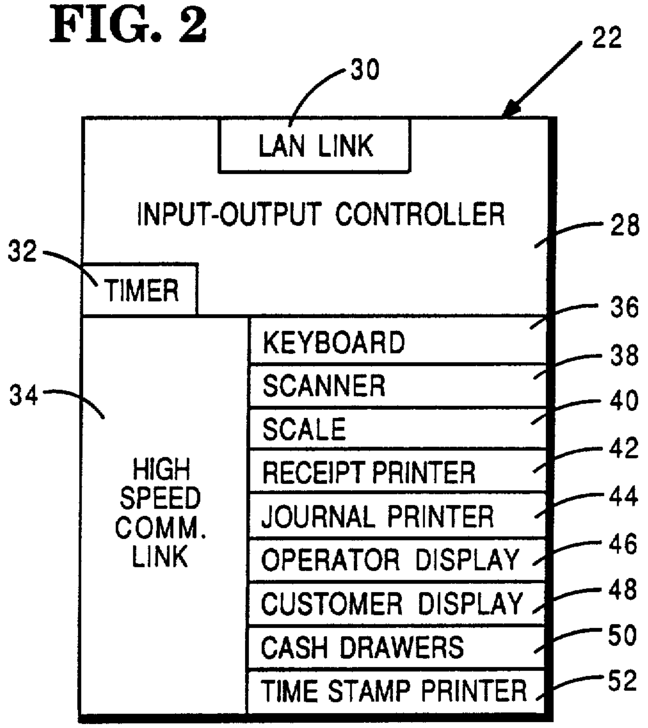

FIG. 6

54

| | | | |
|---|---|---|---|
| P00D5CFAC | X00D5D007 | P00D6D010 | X00D6D09C |
| P00D7D0A5 | X00D7D101 | P00D8D10B | X00D8D196 |
| P00D9D1A1 | X00D9D1FB | P00DAD205 | X00DAD292 |
| P00DBD29B | X00DBD2F5 | P00DCD300 | X00DCD38B |
| P00DD0396 | X00DDD3F0 | P00DED3FA | X00DED486 |

METHOD OF MEASURING MESSAGE RESPONSE TIME PERFORMANCE OF A DATA PROCESSING SYSTEM INCLUDING DATA TERMINALS

BACKGROUND OF THE INVENTION

In a data processing system, such as a system which includes a plurality of point of sale terminals and a central processing unit, it is often required that data which is entered from an input device such as a keyboard or a UPC (universal product code) scanner be sent from a data concentrator or a point of entry terminal to a central processing unit (CPU) for processing. Data resulting from the processing may then be returned to the data concentrator or point of entry terminal. For example, one system in which such an arrangement may be required is the Class 7000 point of sale system, manufactured and marketed by NCR Corporation, Dayton, Ohio.

The processing within the central processing unit may comprise, for example, data verification, processing of the input data, and building of output messages to the terminal. The data verification may include a determination of whether the data has been entered in proper sequence, whether the length of the data entered meets specified criteria, and whether sufficient information has been received to permit further processing. Processing of the input data may include price look-up for universal product code items from a disk subsystem. The building of output messages may comprise the assembly of one or more messages to be displayed on devices present at the point of sale terminal and the assembly of messages to be printed on printer devices controlled by the terminal.

It is important that such point of sale systems be able to accomplish their data processing functions as quickly as possible, since in some point of sale installations, such as supermarkets, a typical customer transaction may consist of forty or more items that must be individually entered at a point of sale terminal, and that are each processed by the central processing unit. The inclusion of a larger number of point of sale terminals in such a system usually results in an increase in the amount of time required to process a single item, due to the increased activity involving the disk system and the increasing requirements imposed upon the resources of the central processing unit.

At times, it may become necessary to monitor and measure the time required to process a data entry from the time that the entry is made at the POS terminal until a data response is received at the terminal from the central processing unit. This time is usually referred to as the response time of the system. These time measurements can be used to determine the effect of adding more terminals to the system. The measurements can also be used to determine the effect that any changes made in the system software have, and whether any software changes are required in order to provide better system performance.

System performance can be measured in a number of ways. One way is by use of external measuring and monitoring devices. These devices are customarily separate stand-alone type instruments, which are often costly and which often require extensive training for an operator to use effectively. Usually a single device is used to monitor activity of a single terminal or of the central processing unit. A second way to monitor performance is by monitoring of input/output within the central processing unit by use of central processing resources such as processing time and storage facilities, which means that such resources are not available for other purposes.

SUMMARY OF THE INVENTION

This invention relates to a method of measuring the performance of a data processing system, and more particularly relates to a method of measuring the performance of a data processing system in which message response time can be determined by the association and comparison of a timing message associated with a message sent from a terminal to the central processing unit and a timing message associated with a related message sent from the central processing unit to the terminal after processing.

In accordance with one embodiment of the invention, a method of measuring message response time performance of a data processing system which includes a central processing unit having data storage, data processing and communications means and also including a plurality of data terminals each having communications means, timing means and means for recording time data, comprises the following steps: sending a first system message to the central processing unit from a data terminal, said message including a sequence number previously provided to said data terminal by said central processing unit; generating a first timing message by said data terminal at substantially the same time that said first system message is sent to said central processing unit, said first timing message including time data taken from the timing means in said data terminal at the time that said first data message is sent to said central processing unit from said data terminal, also including the sequence number included in said system message, and further including an identification of the message as being sent from said terminal to said central processing unit; recording said first timing message; sending a second system message from said central processing unit to said data terminal in response to said first system message, said second system message including a sequence number bearing a predetermined relationship to the sequence number contained in said first system message; generating a second timing message by said data terminal at substantially the same time that said second system message is received by said data terminal, said second timing message including time data taken from the timing means in said data terminal at the time that said second system message is received by said data terminal, also including the sequence number contained in said second system message, and further including an identification of the message as being sent from said central processing unit to said data terminal; recording said second timing message; associating said first timing message with said second timing message by virtue of the predetermined relationship between the sequence numbers included in said first and second timing messages; and comparing the time data included in said first and second timing messages to establish the total time elapsed between the sending of said first system message by said data terminal and the receipt of said second system message by said terminal.

It is accordingly an object of the present invention to provide a method of measuring message response time performance of a data processing system.

Another object is to provide a method of measuring performance of a data processing system which does not require the use of external monitoring or measuring devices and which does not require the use of central processing unit resources which are thus made unavailable for other purposes.

Another object is to provide a method of measuring the performance of a data processing system in which message response time can be determined by the association and comparison of a message sent from a terminal to the central processing unit and a related message sent from the central processing unit to the terminal after processing.

With these and other objects, which will become apparent from the following description, in view, the invention includes certain novel features and combinations, preferred forms or embodiments of which are hereinafter described with reference to the drawings which accompany and form a part of this specification.

BRIEF DESCRIPTION OF THE DRAWINGS

FIG. 1 is a block diagram of a data processing system which includes a central processing unit and a plurality of terminals and which may embody the performance measuring method of the present invention.

FIG. 2 is a block diagram of one of the terminals of FIG. 1.

FIG. 6 shows a portion of a record medium on which is recorded timing information associated with various messages sent from a terminal to a central processing unit and vice versa.

DESCRIPTION OF THE PREFERRED EMBODIMENTS

Figure 3:
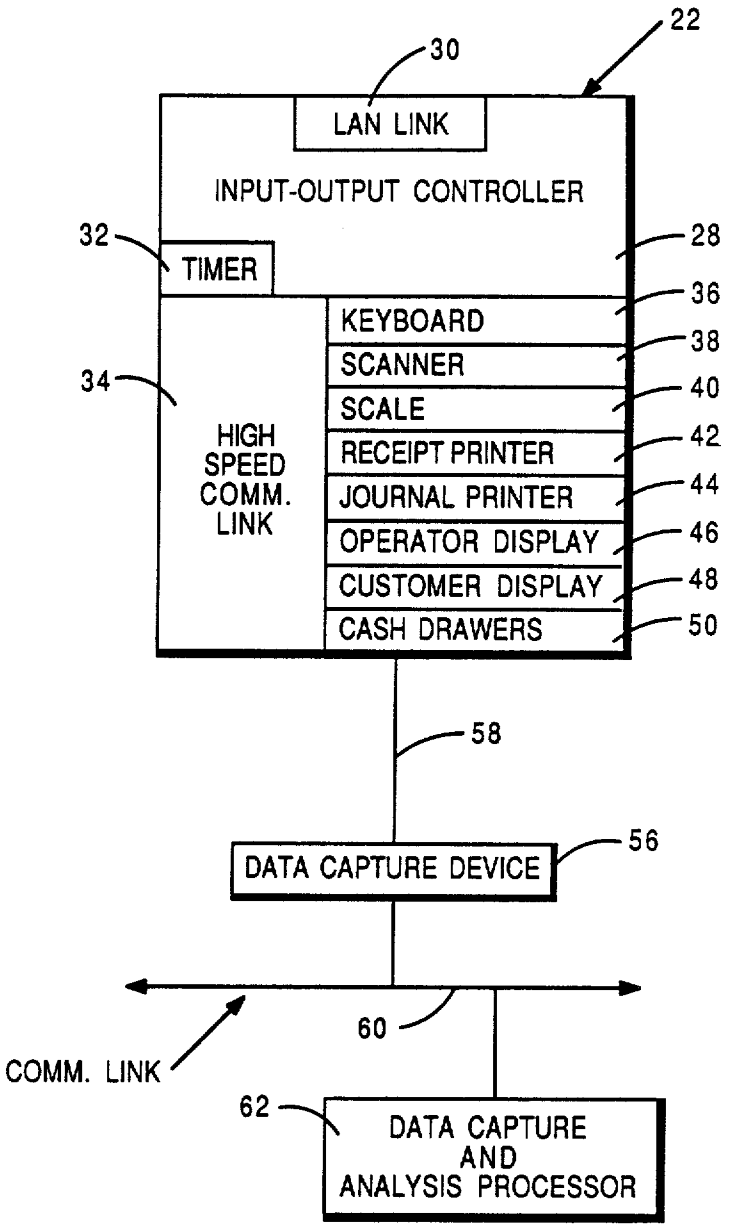
FIG. 3 is a block diagram of a terminal, similar to FIG. 2, and shows a data capture device and a data capture and analysis processor operatively associated with said terminal.

Referring now to FIG. 1, one system in which the present invention may be employed is a point of sale system, such as is shown there. The 7000 system, manufactured and marketed by NCR Corporation, Dayton, Ohio is one such system. The system includes a central processing unit 20 and a plurality of point of sale terminals 22 which are coupled to the unit 20 by means of a high speed local area network communications link, which may be of the MIRLAN type, represented by the reference character 24. A disk sub-system 26 is coupled to the central processing unit 20 to provide storage capability required for operation of the system.

A representation of a point of sale terminal which forms part of the system of FIG. 1 is shown in FIG. 2. Included in the terminal 22 is an input-output controller 28, a local area network link (MIRLAN type) 30 for communications with other parts of the system, and a timer or clock 32, which is an internal clock provided by the hardware of the terminal 22. The input-output controller 28 operates through the local area network link 30 to receive and transmit messages from and to the control processing unit 20. The terminal also includes a high speed serial communication link (LCSIO-low cost serial input/output) 34, through which the input-output controller 28 transfers data and control messages to and from various components and peripheral units, some or all of which may be included in a given terminal 22 depending upon the type of establishment in which the terminal is used and the functions which it is expected to perform. These components and peripheral units may include a keyboard 36, a scanner 38 for scanning price or other coded information on a merchandise tag or package, a scale 40 for weighing produce and other items, a receipt printer 42 for printing a customer receipt for each transaction, a journal printer 44 for maintaining an internal record of transactions within the terminal, an operator display 46 for providing various types of information to the operator, a customer display 48 for providing transaction information to a customer as the transaction is processed, cash drawers 50 for holding amounts paid by the customer and for making change for the customer, and a time stamp printer 52.

The input-output controller 28 receives data from such peripheral devices as the keyboard 36, the scanner 38 and the scale 40, and in addition may receive status information from the printers 42 and 44 and the display devices 46 and 48 via the communications link 34.

The printer 52 is called a time stamp printer because it is required only for use in printing data and status messages which include the times when messages are sent from the terminal to the central processing unit, and the times when messages from the central processing unit are received by the terminal. The time values are provided by the timer 32. The message information is printed on a record medium 54 (FIG. 6) and provides a basis for determining response time, as will subsequently be described in greater detail. The printer 52 is dedicated to the time stamping function and is not used by the application program of the central processing unit 20 for normal output functions. It has a unique address assigned and this address is used by the input-output controller time stamping code to identify this printer for its use.

Shown in FIG. 3 is a terminal 22 similar in all respects to the terminal 22 of FIG. 2, except that no time stamp printer 52 is provided. Instead, each terminal has a data capture device 56 associated therewith by a data link 58. The data capture device 56 contains storage facilities for receiving and storing messages containing timing information. The data capture device 56 is coupled by a multi-drop communication link or local area network 60 to a system data capture and analysis processor 62.

The processor 62 is capable of collecting data from multiple data capture devices 56. The processor 62 reduces the data collected by the data capture devices 56 of the terminals 22, associating related message data by terminal and occurrence, and comparing the times of the messages in order to arrive at a response time for a specific terminal 22 in association with the central processing unit 20. This data is further reduced and analyzed by the system data capture and analysis processor 62 to create statistical information by terminal and by system. This information is stored in accordance with the time interval in which it is collected, allowing displays of performance statistics, graphics and charts to be generated for any time interval by the system data capture and analysis processor 62.

For purposes of illustration of the operation of the present invention it will be assumed that terminals 22 having the embodiment shown in FIG. 2 are employed with a central processing unit 20. In this configuration, the terminals 22 include the printer 52 dedicated to the printing of timing information. As previously mentioned, the timing data is printed out on a record medium 54 (FIG. 6) in the form of a series of messages, each of which includes three different categories of information. Reference to the message or word appearing in the upper left hand corner of the record medium 54 shows that this message contains nine characters, as follows: P00D5CFAC. The first character of this message, the letter P, indicates that this message corresponds to a message containing data which was sent from the central processing unit to the terminal, and was received by the terminal at a time corresponding to the time represented in the present message. The next four characters of the message, in a hexadecimal notation, give a sequence number which is generated by the processing unit 20 and is transmitted to the terminal 22. This sequence number provides a means of identifying messages, and enables related messages to be paired, so that the times shown in two related messages can be paired and the response time can be determined. The next four characters of the message, which are also in hexadecimal notation, give the actual time that the message was received by the terminal 22, as determined by the timer 32.

The word or message to the immediate right of P00D5CFAC is X00D5D007. The first character of this message is the letter X, which indicates that a corresponding message has been sent from the terminal 22 to the central processing unit 20, and that said message includes data to be processed. Such data may be keyboard data, scanner data or scale data, for example. As was the case with the first message described, the next four characters of the message, in hexadecimal notation, give a sequence number. The last four characters, also in hexadecimal notation, give a time value which represents the time that a corresponding message sending data to the central processing unit to be processed from the terminal was transmitted from the terminal 22.

In comparing these two messages, it will be noted that the sequence number 00D5 is the same in both messages, and that the time D007 in the second message is later than the time CFAC in the first message. Comparison of these two values will give the difference in times.

Most frequently, however, it is desired to obtain a response time which is a measure of the difference between the time that a data message is sent to the central processing unit 20 from a terminal 22 and the time that the reply from the central processing unit is received by said terminal. This can be determined in the illustrated example by reference to the third message P00D6D010 appearing to the right of the message X00D5D007 on the record medium 54. As previously stated, the first character P indicates that the message corresponds to a message containing data which was sent from the central processing unit to the terminal. It will be noted that the sequence number 00D6 is one greater than the sequence 00D5 in the previous message. This is because for each output message, the central processing unit, in the illustrated embodiment, increments the sequence number by one. It will further be noted that the time D010 in the latest message is greater than the time value D007 in the previous message. Since it is known to a person comparing the messages that a message coming back from the processing unit will include a sequence number which is one greater than the sequence number associated with the preceding message going from the terminal to the processing unit, the timing messages can readily be paired and the response time for the transaction can be determined to be D010 minus D007. The fourth message X00D6D09C is related to the next message sent from the terminal 22 to the central processing unit 20. The same sequence number as was used in the preceding message is employed. The fifth message P00D7D0A5 appears in the left column on the record medium 54 below the first message P00D5CFAC and its time D0A5 can be compared to the time D09C to obtain a response time. Similar comparisons and analyses can be performed for the remaining messages.

One other comment concerning the timing messages can be made. Some timing messages may include a first character consisting of the letter T. This indicates that a corresponding message was sent from the terminal to the central processing unit without data, and is merely a message to indicate status.

The relating of sequence numbers and the calculation of response time described above can be performed by a human analyst using visual inspection of the record medium 54 and manually calculating response time. Alternatively, the arrangement shown in FIG. 3 can be employed using the data capture device 56 and the data capture and analysis processor 62 to derive the desired information automatically and without the need for human intervention.

Figure 4:
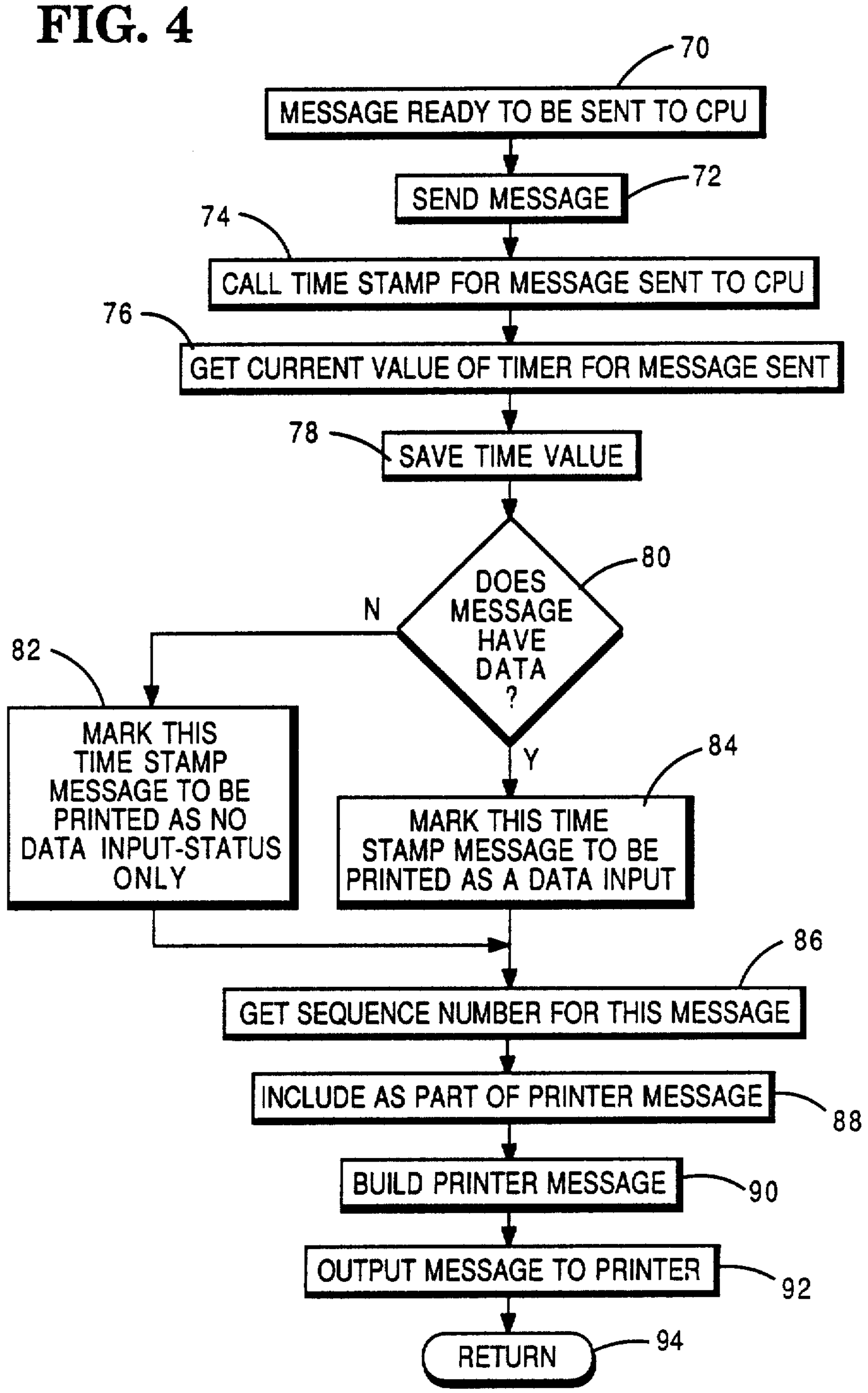
FIG. 4 constitutes a flow diagram of the process for recording a message associated with data sent to a central processing unit from a terminal.

Shown in FIG. 4 is a flow diagram of the process employed to generate and print a timing message in association with the transmission of data from the terminal 22 to the central processing unit 20.

As indicated in block 70, the process begins when a message is ready to be sent to the central processing unit 20 from a terminal 22. At the same time that the message is sent (block 72), the input output controller 28 directs a command to the timer 32 to provide the time at which the message was sent, as indicated in block 74. This time value is obtained as indicated in block 76, and is saved in an appropriate storage location, as indicated in block 78.

Next a determination is made, as represented by block 80, as to whether or not the message transmitted from the terminal 22 to the central processing unit 20 contains data, or is merely a status message. If the message contains no data, the process continues to block 82 in which it is determined that the time stamp message is to be printed as a message containing input status only, not including data, so that the prefix T will be chosen for inclusion in the message as previously described. If the message contains data, the process continues to block 84, in which it is determined that the time stamp message is to be printed as a data input message, so that the prefix X will be chosen for inclusion in the message, as previously described.

Following the blocks 82 and 84, the process paths coincide, and the process continues to block 86, in which a sequence number for the time stamp message is obtained. As has been previously described, this sequence number has been obtained from the central processing unit 20 in a previous message sent from the processing unit to the terminal, and is stored in the input-output controller 28 of the terminal 22. As shown in block 88, a command is given in the input-output controller 28 to include the sequence number as a part of the print message. The print message is then constructed, as indicated in block 90, using the selected prefix, the sequence number and the time taken from the timer 32. Finally the completed message is outputted from the input-output controller 28 to the time stamp printer 52, as indicated in block 92, and the process returns to its beginning to await a command for generation of another message, as indicated in block 94.

Figure 5:
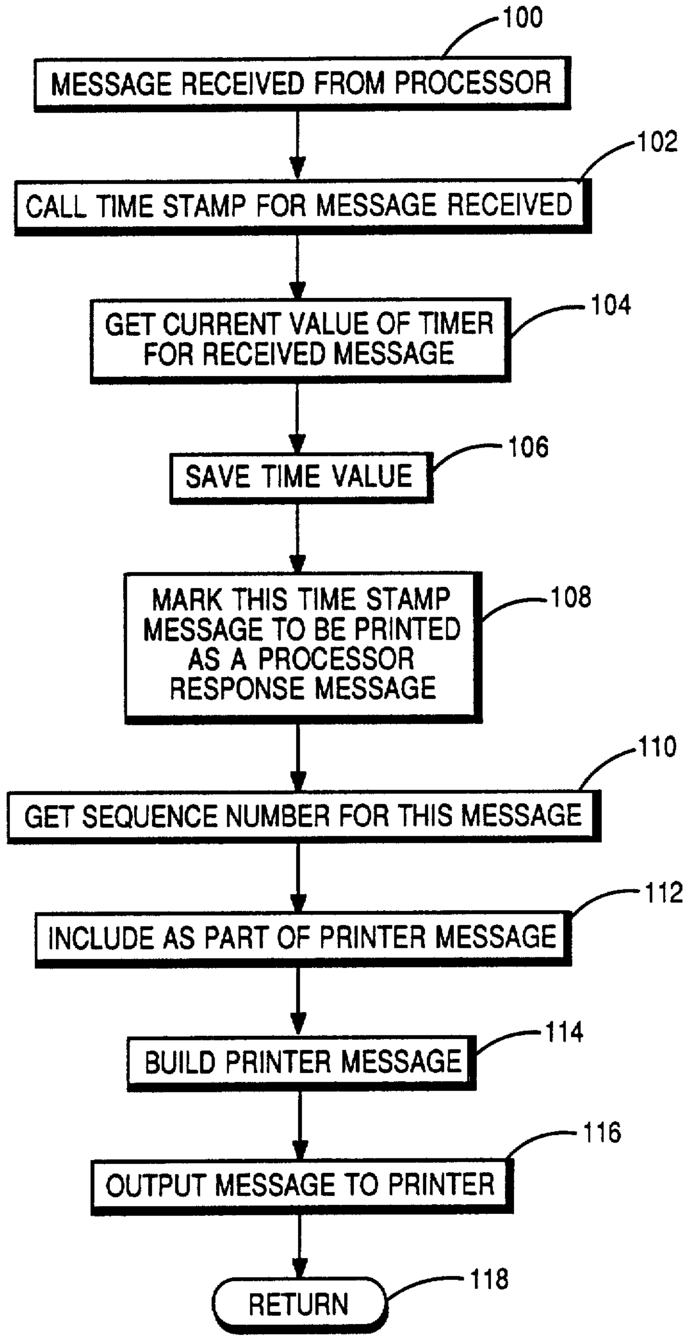
FIG. 5 constitutes a flow diagram of the process for recording a message associated with data sent to a terminal from a central processing unit.

Shown in FIG. 5 is a flow diagram of the process employed to generate and print a timing message in association with the transmission of data from the central processing unit 20 to a selected terminal 22.

As indicated in block 100, the process begins when a message is received by the terminal 22 from the central processing unit 20. At the same time that the message is received (block 102), the input-output controller 28 directs a command to the timer 32 to provide the time at which the message was received. This time value is obtained as indicated in block 104, and is saved in an appropriate storage location, as indicated in block 106.

Next, as indicated in block 108, a prefix P is selected for inclusion in the time stamp message to be printed, to indicate that the message relates to a processor response message.

The process then continues to block 110, in which a sequence number for the time stamp message is obtained. This sequence number is obtained from the message just received from the central processing unit 20 and is stored in the input-output controller 28 of the terminal 22. As shown in block 112, a command is given in the input-output controller 28 to include the sequence number as a part of the print message. The print message is then constructed, as indicated in block 114, using the selected prefix P, the sequence number, and the time taken from the timer 32. Finally the completed message is outputted from the input-output controller 28 to the time stamp printer 52, as indicated in block 116, and the process returns to its beginning to await a command for generation of another message, as indicated in block 118.

It will be noted that the processes described above and shown in the flow diagrams of FIGS. 4 and 5 are directed to the embodiment of the invention shown in FIG. 2, in which the printer 52 is employed to print the various messages on the record medium 54. Similar processes would be involved in utilizing the embodiment of the invention shown in FIG. 3, except that the actual printing of each individual message would not be necessary unless desired, and the comparison of sequence numbers, computation of response times, and any other desired analyses or tabulations could be carried on by the data capture device 56 and the data capture and analysis processor 62.

Analysis of the data can be used to determine if the system performance is satisfactory, and to detect when or if the system begins to operate below expectations. Corrective action can then be taken, and further testing can be performed to determine the results of such corrective actions.

This method of measuring performance of a data processing system is believed to provide a number of significant advantages, which are summarized below.

Each terminal 22 can be provided with its own built-in time stamping printer. No separate stand-alone devices are required to perform the monitoring function.

The output of the timer is real time; the output occurs as the system is running, with no control required by the application program in the central processing unit 20. There is no requirement for "dumping" of the saved time data to a CRT screen or to a separate printer.

Some performance measuring methods use the internal storage of the central processing unit to store the time data for performance analysis. These methods require central processing unit activity to generate the time information on a real time basis. Use of internal or external storage of the central processing unit may present problems to the system since storage space may be limited. The storage and time stamp activity could have an effect on the response time which is being measured. The method of the present invention does not have any effect on the activity in the central processing unit since the monitoring is done completely in the terminals and will not distort the response time in the central processing unit.

The method of the present invention provides a precise measurement of response time since it measures the message from the terminal to the central processing unit at the time that such message is transmitted, and measures the message from the central processing unit to the terminal at the time that such message is received by the terminal.

If a user of the system has a question concerning the performance of the system at an installation, such as a supermarket, the present method of determining system performance can be used at the site by simply adding an additional printer to any or all of the terminals which are not already provided with a dedicated time stamp printer. The present method does not require the use of any expensive tools, other than a calculator, to determine the response times for each terminal.

This method of response time measuring and recording can be used to determine whether a particular terminal in the system is experiencing a longer or shorter response time as compared to the other terminals controlled by the central processing unit. At times, the software in the application program may service one or more terminals more or less frequently than it services others. This may be due to the algorithms used by the central processing unit software that controls the terminals. Having the response times available at each terminal allows the software to "balance" the servicing of each terminal to avoid the problem of servicing one or more terminals more or less frequently.

While the forms of the invention illustrated and described herein are particularly adapted to fulfill the objects aforesaid, it is to be understood that other and further modifications within the scope of the appended claims may be made without departing from the spirit of the invention.

What is claimed is:

1. A method of measuring message response time performance of a data processing system which includes a central processing unit having data storage, data processing and communications means and also including a plurality of data terminals each having communications means, timing means and means for recording time data, comprising the following steps:

sending a first system message to the central processing unit from a data terminal, said message including a sequence number previously provided to said data terminal by said central processing unit;

generating a first timing message by said data terminal at substantially the same time that said first system message is sent to said central processing unit, said first timing message including time data taken from the timing means in said data terminal at the time that said first data message is sent to said central processing unit from said data terminal, also including the sequence number included in said system message, and further including an identification of the message as being sent from said terminal to said central processing unit;

recording said first timing message;

sending a second system message from said central processing unit to said data terminal in response to said first system message, said second system message including a sequence number bearing a predetermined relationship to the sequence number contained in said first system message;

generating a second timing message by said data terminal at substantially the same time that said second system message is received by said data terminal, said second timing message including time data taken from the timing means in said data terminal at the time that said second system message is received by said data terminal, also including the sequence number contained in said second system message, and further including an identification of the message as being sent from said central processing unit to said data terminal;

recording said second timing message;

associating said first timing message with said second timing message by virtue of the predetermined relationship between the sequence numbers included in said first and second timing messages; and comparing the time data included in said first and second timing messages to establish the total time elapsed between the sending of said first system message by said data terminal and the receipt of said second system message by said data terminal.

2. The method of claim 1 in which the first system message includes transaction data generated by said data terminal.

3. The method of claim 2 in which the second system message includes data generated by said central processing unit for transmission to said data terminal in response to data transmitted from said data terminal to said central processing unit in said first system message.

4. The method of claim 1 in which the identification included in said first and second timing messages may include a first character to indicate that an associated system message contained transaction information and was transmitted from said data terminal to said central processing unit, or may include a second character to indicate that an associated system message contained data generated by said central processing unit and was transmitted from said central processing unit to said data terminal, or may include a third character to indicate that an associated system message was for status only.

5. The method of claim 1, in which said first and second timing messages are recorded by a printer which is included in the data terminal and which is dedicated exclusively to such recording.

6. The method of claim 1 in which said data processing system also includes data capture means having storage means and also includes analysis processing means both coupled to said plurality of data terminals, in which said first and second timing messages are recorded in said storage means in said data capture means, and in which the steps of associating related first and second timing messages and comparing the time data included in said messages to establish total time elapsed are carried out by said analysis processing means.

7. The method of claim 6 in which said time data included in said messages is stored in accordance with a time interval during which it is collected, and in which displays of performance statistics, graphics and charts of said time data for a given time interval during which said time data is collected can be generated by said analysis processing means.

8. The method of claim 6 in which said analysis processing means collects and analyzes data from a plurality of data terminals.

9. The method of claim 1 in which each of said data terminals is a point of sale terminal having a keyboard, a display and a printer for receiving, recording and displaying transaction data originating at said data terminal and transmitted to said data terminal from said central processing unit.

10. The method of claim 1 in which the predetermined relationship of the sequence number in the second system message with respect to the sequence number in the first system message is that said sequence number in the second system message is greater by a value of one.

11. The method of claim 1 in which the format of said timing messages comprises one identification character, four sequence number characters and four time characters.

12. The method of claim 1 in which a plurality of data terminals in a data processing system are provided with printers dedicated to recording of timing messages, in which system messages associated with more than one data terminal may be communicated to and from said central processing unit, and in which first and second timing messages generated by the printer in each data terminal can be associated by the predetermined relationship of their sequence numbers for comparison to establish total time elapsed between sending of a first system message by a given data terminal and receipt of a related second system message from said central processing unit by said data terminal.

* * * * *